US012267175B2

(12) United States Patent
Sun et al.

(10) Patent No.: US 12,267,175 B2
(45) Date of Patent: Apr. 1, 2025

(54) TRANSMISSION PROCESSING METHOD AND DEVICE

(71) Applicant: VIVO MOBILE COMMUNICATION CO., LTD., Guangdong (CN)

(72) Inventors: Peng Sun, Dongguan (CN); Huaming Wu, Dongguan (CN); Fei Qin, Dongguan (CN); Yumin Wu, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 346 days.

(21) Appl. No.: 17/873,945

(22) Filed: Jul. 26, 2022

(65) Prior Publication Data

US 2022/0368469 A1 Nov. 17, 2022

Related U.S. Application Data

(63) Continuation of application No. PCT/CN2021/082580, filed on Mar. 24, 2021.

(30) Foreign Application Priority Data

Mar. 31, 2020 (CN) .......................... 202010246137.0

(51) Int. Cl.
*H04L 1/18* (2023.01)
*H04L 1/00* (2006.01)
*H04L 1/1829* (2023.01)

(52) U.S. Cl.
CPC .......... *H04L 1/1845* (2013.01); *H04L 1/0003* (2013.01); *H04L 1/0061* (2013.01)

(58) Field of Classification Search
None
See application file for complete search history.

(56) References Cited

U.S. PATENT DOCUMENTS 5,267,021 A * 11/1993 Ramchandran ........ H04N 11/30
375/E7.188
7,835,340 B2  11/2010 Jin et al.
(Continued)

FOREIGN PATENT DOCUMENTS

CN    101478373 A    7/2009
CN    103262630 A    8/2013
(Continued)

OTHER PUBLICATIONS

Supplementary European Search Report regarding European Patent Application No. 21781433.4-1206, dated Jan. 2, 2023.
(Continued)

*Primary Examiner* — Eunsook Choi
(74) *Attorney, Agent, or Firm* — Harness, Dickey & Pierce, P.L.C.

(57) ABSTRACT

A transmission processing method includes: coding a transmission bit in an available coding scheme; and sending coded information, where the available coding scheme includes at least one of: performing joint source-channel coding at a physical layer; performing channel coding with a code rate greater than one at the physical layer; performing joint source-channel coding with a code rate greater than one at the physical layer; performing channel coding at the physical layer by directly using an input bit as an output bit; performing channel coding at the physical layer, the channel coding including at least the following two parts: a CRC part and a part directly using an input bit as an output bit; and using joint channel-source coding at a non-physical layer.

20 Claims, 4 Drawing Sheets

(56) References Cited

U.S. PATENT DOCUMENTS

| | | |
|---|---|---|
| 8,675,577 B2 | 3/2014 | Oyman et al. |
| 10,129,928 B2* | 11/2018 | Jia .................... H04L 1/1819 |
| 2003/0223467 A1 | 12/2003 | T. |
| 2009/0238066 A1* | 9/2009 | Cheng .................. H04L 1/0067 714/751 |
| 2009/0290548 A1* | 11/2009 | Lee ....................... H04N 19/30 370/329 |
| 2011/0021153 A1* | 1/2011 | Safavi .................. H04L 1/0026 455/63.1 |
| 2012/0039385 A1 | 2/2012 | Yilmaz et al. |
| 2012/0069927 A1* | 3/2012 | Oyman ................. H04L 1/0019 375/285 |
| 2013/0201857 A1* | 8/2013 | Bhargava ............. H04W 72/02 370/252 |
| 2015/0326412 A1* | 11/2015 | Charalambous ............................ H04L 25/03828 375/295 |
| 2016/0227521 A1* | 8/2016 | Han ................. H04W 72/0453 |
| 2018/0097555 A1 | 4/2018 | Nammi |
| 2019/0044646 A1* | 2/2019 | Xu ...................... H04L 27/36 |
| 2019/0103883 A1* | 4/2019 | Ye ....................... H04L 1/0042 |
| 2019/0260623 A1* | 8/2019 | Li ...................... H04L 27/2627 |
| 2020/0021391 A1* | 1/2020 | Rico Alvarino ........ H04W 8/24 |
| 2020/0162203 A1* | 5/2020 | Bang .................... H04L 1/1822 |
| 2021/0160149 A1* | 5/2021 | Ma ...................... H04W 76/10 |
| 2021/0243784 A1* | 8/2021 | Goto .................... H04W 72/21 |

FOREIGN PATENT DOCUMENTS

| | | |
|---|---|---|
| CN | 103905152 A | 7/2014 |
| CN | 105900494 A | 8/2016 |
| CN | 107508656 A | 12/2017 |
| CN | 110493603 A | 11/2019 |
| EP | 3127377 B1 | 7/2018 |

OTHER PUBLICATIONS

"Quality Driven Wireless Video Transmission for Medical Applications," M.G. Martini, et al., Proceedings of the 28th IEEE, XP31187102A, Sep. 3, 2006.

"Joint Source-Channel Coding at the Application Layer," O.Y. Bursalioglu, et al., 2009 Data Compression Conference DCC '09, IEEE, XP31461091A, dated Mar. 16, 2009.

International Search Report and Written Opinion of the International Searching Authority regarding International Patent Application No. PCT/CN2021/082580, dated Jun. 23, 2021. Translation provided by Bohui Intellectual Property.

First Office Action regarding Chinese Patent Application No. 202010246137.0, dated Mar. 3, 2022. Translation provided by Bohui Intellectual Property.

Second Office Action regarding European Patent Application No. 21781433.4, dated Jun. 10, 2024.

\* cited by examiner

TRANSMISSION PROCESSING METHOD AND DEVICE

CROSS-REFERENCE TO RELATED APPLICATIONS

This application is a Bypass Continuation Application of PCT/CN2021/082580 filed on Mar. 24, 2021, which claims priority to Chinese Patent Application No. 202010246137.0 filed on Mar. 31, 2020, which are incorporated herein by reference in their entirety.

TECHNICAL FIELD

The present application relates to the field of communication technologies, and in particular, to a transmission processing method and a device.

BACKGROUND

Shannon points out through the separation theorem that, source coding and channel coding may separately perform optimization without sacrificing the whole performance of the system. Each current information system is designed based on the principle. For example, in a video service performed through a 5th-Generation mobile communication technology (5G) network, a video server is responsible for source coding, and the 5G network is responsible for transmitting bits coded by a source to a terminal side according to a quality of service (QoS) requirement. In the 5G network, when transmission is performed between different nodes, different types of channel coding are respectively used to adapt to different channel conditions (for example, wired and wireless).

However, premises on which the separation theorem of Shannon is proved are a point-to-point system with a single transmitter and a single receiver, a stationary channel, and an infinite packet length, but none of the foregoing three premises or assumptions is met in the actual system. Therefore, the current processing manner of separating source coding from channel coding usually increases the processing time and causes the resource waste.

SUMMARY

According to a first aspect, an embodiment of the present application provides a transmission processing method, applied to a transmitting device, the method including:
coding a transmission bit in an available coding scheme; and
sending coded information, where
the available coding scheme includes at least one of:
performing joint source-channel coding at a physical layer;
performing channel coding with a code rate greater than one at the physical layer;
performing joint source-channel coding with a code rate greater than one at the physical layer;
performing channel coding at the physical layer by directly using an input bit as an output bit;
performing channel coding at the physical layer, the channel coding including at least the following two parts: a cyclic redundancy check CRC part and a part directly using an input bit as an output bit; or
using joint channel-source coding at a non-physical layer.

According to a second aspect, an embodiment of the present application further provides a transmission processing method, applied to a receiving device, the method including:
decoding coded information that is received, where the coded information is obtained by performing coding in an available coding scheme, where
the available coding scheme includes at least one of:
performing joint source-channel coding at a physical layer;
performing channel coding with a code rate greater than one at the physical layer;
performing joint source-channel coding with a code rate greater than one at the physical layer;
performing channel coding at the physical layer by directly using an input bit as an output bit;
performing channel coding at the physical layer, the channel coding including at least the following two parts: a cyclic redundancy check CRC part and a part directly using an input bit as an output bit; or
using joint channel-source coding at a non-physical layer.

According to a third aspect, an embodiment of the present application further provides a transmitting device, including:
a first processing module, configured to code a transmission bit in an available coding scheme; and
a first sending module, configured to send coded information, where
the available coding scheme includes at least one of:
performing joint source-channel coding at a physical layer;
performing channel coding with a code rate greater than one at the physical layer;
performing joint source-channel coding with a code rate greater than one at the physical layer;
performing channel coding at the physical layer by directly using an input bit as an output bit;
performing channel coding at the physical layer, the channel coding including at least the following two parts: a cyclic redundancy check CRC part and a part directly using an input bit as an output bit; or
using joint channel-source coding at a non-physical layer.

According to a fourth aspect, an embodiment of the present application further provides a receiving device, including:
a second processing module, configured to decode coded information that is received, where the coded information is obtained by performing coding in an available coding scheme, where
the available coding scheme includes at least one of:
performing joint source-channel coding at a physical layer;
performing channel coding with a code rate greater than one at the physical layer;
performing joint source-channel coding with a code rate greater than one at the physical layer;
performing channel coding at the physical layer by directly using an input bit as an output bit;
performing channel coding at the physical layer, the channel coding including at least the following two parts: a cyclic redundancy check CRC part and a part directly using an input bit as an output bit; or
using joint channel-source coding at a non-physical layer.

According to a fifth aspect, an embodiment of the present application further provides a communication device, including a processor, a memory, and a computer program stored on the memory and executable on the processor, where the computer program is executed by the processor to implement the steps of the foregoing transmission processing method applied to the transmitting device or the steps of the foregoing transmission processing method applied to the receiving device.

According to a sixth aspect, an embodiment of the present application further provides a non-transitory computer-readable storage medium, storing a computer program. The computer program, when executed by a processor, implements the steps of the foregoing transmission processing method applied to the transmitting device or the steps of the foregoing transmission processing method applied to the receiving device.

DETAILED DESCRIPTION

To make the technical problems, the technical solutions, and advantages of the present application that are to be resolved more clearly, detailed description is made below with reference to the accompanying drawings and specific embodiments.

It should be learned that, a 3rd Generation Partnership Project (3GPP) related protocol stack has a structure shown in the following table 1, frequently used source coding is located at an application layer, and channel coding is located at a physical layer (Physical Layer, PHY):

TABLE 1

| | |
|---|---|
| Transmission Control Protocol (TCP) or User Datagram Protocol (UDP) | Traffic control, and port identification |
| Internet Protocol (IP) | Routing |
| Packet Data Convergence protocol (PDCP) | Encryption |
| Radio Link Control (RLC) protocol | Segmentation, and transparent transmission in a transmission mode (TM) without any processing |
| Media Access Control (MAC) protocol | Resource adaptation, packet assembly, addressing, and link management (retransmission, adaptation, and the like) at a physical layer |
| PHY | Channel coding, adjustment, and physical layer procedure |

Figure 1:
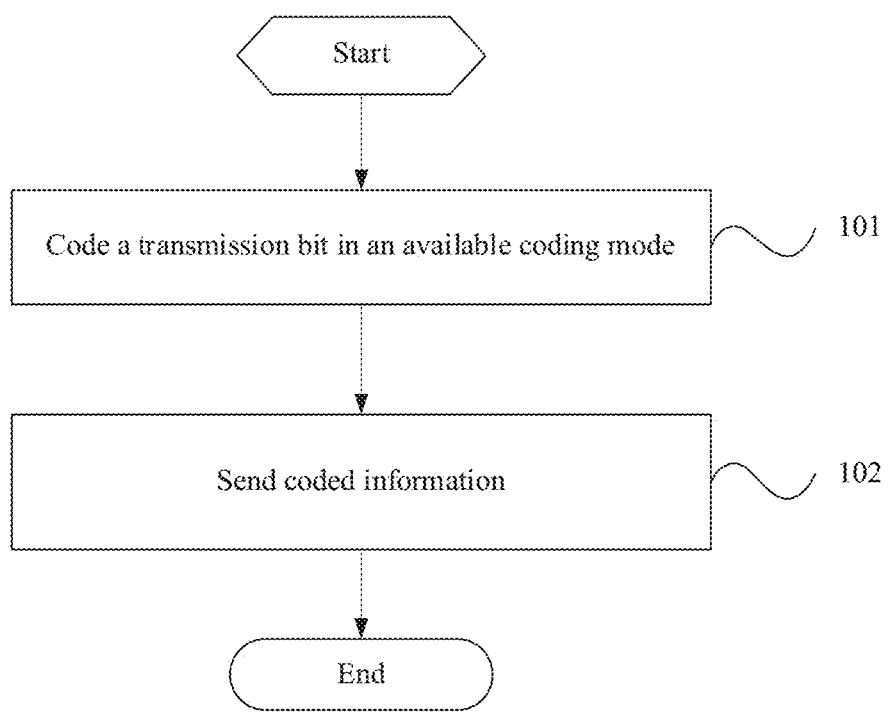
FIG. 1 is a schematic diagram of steps of a transmission processing method applied to a transmitting device according to an embodiment of the present application.

Therefore, to reduce the time delay of the transmission processing, as shown in FIG. 1, an embodiment of the present application provides a transmission processing method applied to a transmitting device. The method includes the following steps.

Step 101: code a transmission bit in an available coding scheme.

Step 102. Send coded information, where
the available coding scheme includes at least one of:
performing joint source-channel coding at a physical layer;

performing channel coding with a code rate greater than one at the physical layer;

performing joint source-channel coding with a code rate greater than one at the physical layer;

performing channel coding at the physical layer by directly using an input bit as an output bit;

performing channel coding at the physical layer, the channel coding including at least the following two parts: a cyclic redundancy check (CRC) part and a part directly using an input bit as an output bit; or using joint channel-source coding at a non-physical layer.

Therefore, according to the foregoing step 101 and step 102, the transmitting device to which the method of this embodiment of the present application is applied codes a transmission bit in an available coding scheme; and then sends coded information, to complete current transmission. The available coding scheme includes at least one of: performing joint source-channel coding at a physical layer; performing channel coding with a code rate greater than one at the physical layer; performing joint source-channel coding with a code rate greater than one at the physical layer; performing channel coding at the physical layer by directly using an input bit as an output bit; performing channel coding at the physical layer, the channel coding including at least the following two parts: a cyclic redundancy check CRC part and a part directly using an input bit as an output bit; or using joint channel-source coding at a non-physical layer. Therefore, the coding the transmission bit in the available coding scheme can effectively reduce the time delay of the transmission processing.

In this embodiment, the joint source-channel coding is joint source-channel coding based on a deep learning neural network.

The code rate refers to a ratio of the quantity of coded input bits to the quantity of output bits. For the channel coding at the physical layer including at least the CRC part and the part directly using an input bit as an output bit, the CRC part may be parity check bits of 16 bits or 24 bits, and is configured to determine whether a received bit is correct.

For example, in this embodiment, the available coding scheme is performing joint source-channel coding at the non-physical layer. For example, all joint source-channel coding is placed at an application layer, and a corresponding packet assembly procedure is as follows:

the application layer performs joint source-channel coding according to information provided by a MAC layer, and directly generates a packet that does not need to be further assembled at the MAC layer;

the UDP identifies a port number of the corresponding packet;

the packet for the identified port number is directly transparently transmitted to the MAC layer;

the MAC layer determines a target device according to higher-layer application information, and generates corresponding control information;

the physical layer sends a physical-layer control channel according to the control information of the MAC layer; and the physical layer sends a physical-layer data channel according to resource information of the MAC layer, modulation information, and physical layer procedure information.

Alternatively, the available coding scheme is performing joint source-channel coding at the physical layer, that is, the joint source-channel coding is placed at the physical layer, and a corresponding packet assembly procedure is as follows:

the application layer optionally performs encryption and decryption or out-of-order rearrangement;

the UDP identifies a port of a corresponding packet;

the packet for the identified port number is directly transparently transmitted to the MAC layer;

a packet corresponding to control plane signaling (for example, RRC) is transmitted to the MAC layer and reused at the MAC layer; and the MAC layer performs the following processing:

(1) determining a parameter corresponding to joint source-channel coding according to a channel state, a service type determined by a higher layer, and other information;

(2) being responsible for retransmission management, and determining whether to perform retransmission according to a PHY decoding result;

(3) determining a target user according to an application layer message, and generating corresponding physical layer control information; and (4) performing packet disassembly, reusing, and the like according to the channel state and a size of a higher layer packet.

the physical layer performs the following processing:

(1) performing joint source-channel coding and decoding according to information determined by the MAC layer;

(2) sending a physical-layer control channel according to control information of the MAC layer; and (3) sending a physical-layer data channel according to resource information of the MAC layer, modulation information, and physical layer procedure information.

In this embodiment, the transmitting device may be a user-side device or may be a network-side device. The user-side device may refer to an access terminal, a subscriber unit, a subscriber station, a mobile station, a mobile console, a remote station, a remote terminal, a mobile device, a user terminal, a terminal, a wireless communication device, a user agent, or a user apparatus. The user-side device may alternatively be a cellular phone, a cordless phone, a session initiation protocol (SIP) phone, a wireless local loop (WLL) station, a personal digital assistant (PDA), a handheld device or a computing device having a wireless communication function, or another processing device, in-vehicle device, or wearable device connected to a wireless modem. The network-side device may refer to a base station, a core network, or the like.

Optionally, the available coding scheme is indicated in a manner of indicating a Modulation and Coding Scheme (MCS) table, where the MCS table is used for indicating at least one of a code rate or a modulation scheme.

Therefore, the transmitting device may determine, through the MCS table for indication, the available coding scheme used for transmission, or may cause, by indicating the MCS table to the receiving device, the receiving device to learn the available coding scheme used for transmission, to perform corresponding decoding.

Optionally, the non-physical layer is a layer above a Transmission Control Protocol or User Datagram Protocol layer.

Moreover, in this embodiment, the method further includes:

sending coding and decoding indication information, where the coding and decoding indication information includes information indicating at least one of:

whether to use channel coding;

whether to use joint source channel coding;

whether to use a type of coding with a code rate greater than one;

whether to use channel coding at the physical layer;

whether to use channel coding or joint source-channel coding at the non-physical layer;

whether to perform channel coding at the physical layer by directly using an input bit as an output bit; or whether to perform channel coding at the physical layer, the channel coding including at least the following two parts: a CRC part and a part directly using an input bit as an output bit.

The transmitting device sends the coding and decoding indication information, and may inform the receiving device of at least one of the following information of the transmitting device: whether to use channel coding; whether to use joint source channel coding; whether to use a type of coding with a code rate greater than one; whether to use channel coding at the physical layer; whether to use channel coding or joint source-channel coding at the non-physical layer; whether to perform channel coding at the physical layer by directly using an input bit as an output bit; or whether to perform channel coding at the physical layer, the channel coding including at least the following two parts: a CRC part or a part directly using an input bit as an output bit. In this way, the receiving device can perform corresponding decoding through the learned coding and decoding indication information.

Moreover, in this embodiment, the method further includes:

exchanging a coding and decoding parameter, where the coding and decoding parameter includes at least one of the following information:

a physical layer related parameter;

a computing resource related parameter;

a service related parameter;

a network related parameter;

an algorithm parameter required by the transmitting device during coding;

an overall evaluation parameter; or parameter indication information.

In this way, the coding and decoding parameter is exchanged between the transmitting device and the receiving device, to complete coding and decoding of transmission. For example, the transmitting device sends the coding and decoding parameter to the receiving device, or the receiving device sends the coding and decoding parameter to the transmitting device.

Optionally, the physical layer related parameter includes at least one of the following information:

an available physical resource;
a channel type; or
an environmental parameter.

The channel type includes at least: one of a signal-to-noise ratio, a Doppler spread, and a Delay spread. The environmental parameter includes at least: one of a moving speed, an indoor parameter, and an outdoor parameter.

Optionally, the computing resource related parameter includes at least one of the following information:
   a network size that the transmitting device and/or a receiving device can process;
   a network depth that the transmitting device and/or the receiving device can process; or
   a network type that the transmitting device and/or the receiving device can process.

Optionally, the service related parameter includes at least one of the following information:
   a quantity of bits in each application cache;
   a target quality of service;
   a service type; or
   a historical experience.

The target quality of service QoS may include a user experience parameter, for example, luminance or quality that may affect the user experience. The service type includes at least a service feature, for example, content in an image, a video, a voice, or a text. The historical experience may be generated according to a criterion defined in advance. For example, the corresponding historical experience is generated according to the deep learning neural network configured in advance. The historical experience may implicitly correspond to an evaluation of signal satisfaction of the receiving device.

Optionally, the network related parameter includes at least one of the following information:
   a network type;
   a network coefficient;
   an activation function type; or
   indication information identifying at least one of the network type, the network coefficient, or the activation function type.

Through the indication information identifying at least one of the network type, the network coefficient, or the activation function type, one or more of the identified corresponding network type, network coefficient, and activation function type may be determined. The network type, the network coefficient, and the activation function type may be corresponding content of the deep learning neural network used for joint source-channel coding.

Optionally, the algorithm parameter required by the transmitting device during coding includes at least one of the following information:
   an algorithm type;
   an algorithm related coefficient; or
   indication information identifying an algorithm related parameter set.

Through the indication information identifying the algorithm related parameter set, the algorithm related parameter set may be determined, and then the algorithm related coefficient is obtained.

Moreover, the overall evaluation parameter may be historical experiences or evaluation parameters for different applications. The parameter indication information is other parameters formed according to one or a combination of more than one of the foregoing parameters, and the quantity of the other parameters may be less than the quantity of original parameters.

Certainly, this embodiment is not limited to directly exchanging specific content of the coding and decoding parameter. Optionally, the exchanging a coding and decoding parameter includes:
   obtaining indication information of the coding and decoding parameter.

The indication information of the coding and decoding parameter may be used for explicit indication or implicit indication (for example, included in data). For example, a parameter set including one or more of the physical layer related parameter, the computing resource related parameter, the service related parameter, the network related parameter, the algorithm parameter required by the transmitting device during coding, the overall evaluation parameter, and the parameter indication information is configured in advance, and the indication information of the coding and decoding parameter may correspond to one of parameter sets.

Certainly, if there is no indication information of the coding and decoding parameter, a parameter configured in advance may be used.

Optionally, the coding and decoding parameter is configured in advance or indicated through at least one of the following target sources:
   the physical layer of the transmitting device;
   a Media Access Control MAC layer of the transmitting device;
   Radio Resource Control RRC layer of the transmitting device;
   an application layer of the transmitting device;
   a receiving device;
   a physical layer of the receiving device;
   a MAC layer of the receiving device;
   RRC layer of the receiving device; or
   a control node.

The coding and decoding parameter configured in advance may be configured by a system or a user, or may be defined in a protocol.

In this embodiment, in consideration of reliability of transmission, the method further includes:
   determining whether data retransmission is required.

Optionally, the determining whether data retransmission is required includes:
   determining whether retransmission is required according to feedback information of the receiving device, where the feedback information includes at least one of the following information:
   a CRC result;
   whether receiving is performed correctly;
   quality of decoded data; or
   an application corresponding to the data.

Optionally, the quality of the decoded data is generated in a manner specified in advance.

Optionally, the manner specified in advance includes assigning a network for calculating the quality of the decoded data.

If it is determined that retransmission is required, optionally, in this embodiment, after the determining whether data retransmission is required, the method further includes:
   retransmitting, in a case that data retransmission is required, to-be-transmitted data by using coding the same as that of last transmission or coding different from that of last transmission.

Therefore, retransmission may be performed by using coding the same as that of the last transmission or coding different from that of the last transmission.

For whether to perform retransmission, a criterion may be uniformed between the transmitting device and the receiving device, and different criteria may be used for different applications. Certainly, alternatively, the transmitting device may determine whether to perform a retransmission indication to the receiving device after retransmission.

In this embodiment, the coding and decoding indication information, the available coding scheme, and the coding and decoding parameter may be transferred in at least one of the following manners:
downlink control information (DCI);
a Media Access Control Control Element (MAC CE); RRC;
an inter-layer interface;
an application layer; or
a higher-layer message.

Moreover, one of the coding and decoding indication information, the available coding scheme, and the coding and decoding parameter that are configured in advance may alternatively be selected and activated.

It should be further understood that, the transmitting device to which the method of this embodiment of the present application is applied may be used as a receiving device in other transmission.

To sum up, in the method of this embodiment of the present application, a transmission bit is coded in an available coding scheme; and then coded information is sent, to complete current transmission. The available coding scheme includes at least one of: performing joint source-channel coding at a physical layer; performing channel coding with a code rate greater than one at the physical layer; performing joint source-channel coding with a code rate greater than one at the physical layer; performing channel coding at the physical layer by directly using an input bit as an output bit; performing channel coding at the physical layer, the channel coding including at least the following two parts: a cyclic redundancy check CRC part or a part directly using an input bit as an output bit; or using joint channel-source coding at a non-physical layer. Therefore, the coding the transmission bit in the available coding scheme can effectively reduce the time delay of the transmission processing.

Figure 2:
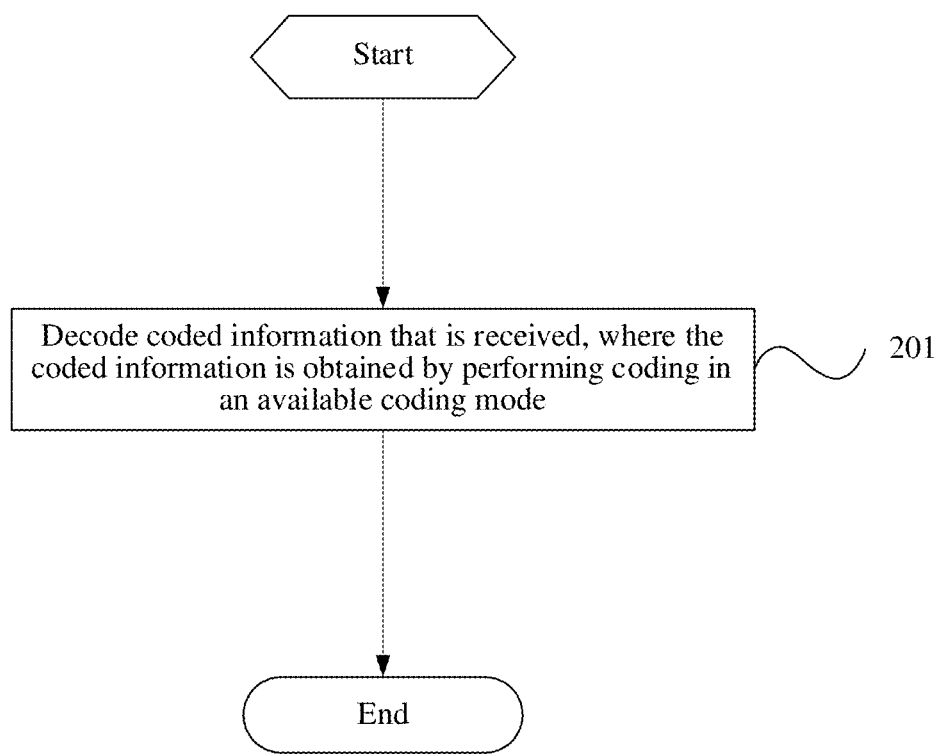
FIG. 2 is a schematic diagram of steps of a transmission processing method applied to a receiving device according to an embodiment of the present application.

As shown in FIG. 2, an embodiment of the present application provides a transmission processing method, applied to a receiving device, the method including:
step 201: decode coded information that is received, where the coded information is obtained by performing coding in an available coding scheme, where
the available coding scheme includes at least one of:
performing joint source-channel coding at a physical layer;
performing channel coding with a code rate greater than one at the physical layer;
performing joint source-channel coding with a code rate greater than one at the physical layer;
performing channel coding at the physical layer by directly using an input bit as an output bit;
performing channel coding at the physical layer, the channel coding including at least the following two parts: a cyclic redundancy check CRC part and a part directly using an input bit as an output bit; or
using joint channel-source coding at a non-physical layer.

In the method of this embodiment of the present application, coded information that is received is decoded. The coded information is obtained by performing coding in an available coding scheme, and the available coding scheme includes at least one of: performing joint source-channel coding at a physical layer; performing channel coding with a code rate greater than one at the physical layer; performing joint source-channel coding with a code rate greater than one at the physical layer; performing channel coding at the physical layer by directly using an input bit as an output bit; performing channel coding at the physical layer, the channel coding including at least the following two parts: a cyclic redundancy check CRC part or a part directly using an input bit as an output bit; or using joint channel-source coding at a non-physical layer. Therefore, the decoding of the coded information can effectively reduce the time delay of the transmission processing.

Optionally, the available coding scheme is indicated in a manner of indicating a Modulation and Coding Scheme MCS table, where the MCS table is used for indicating at least one of a code rate or a modulation scheme.

Optionally, the non-physical layer is a layer above a Transmission Control Protocol or User Datagram Protocol layer.

Optionally, the method further includes:
receiving coding and decoding indication information, where the coding and decoding indication information includes information indicating at least one of:
whether to use channel coding;
whether to use joint source channel coding;
whether to use a type of coding with a code rate greater than one;
whether to use channel coding at the physical layer;
whether to use channel coding or joint source-channel coding at the non-physical layer;
whether to perform channel coding at the physical layer by directly using an input bit as an output bit; or
whether to perform channel coding at the physical layer, the channel coding including at least the following two parts: a CRC part or a part directly using an input bit as an output bit.

Optionally, the method further includes:
exchanging a coding and decoding parameter, where the coding and decoding parameter includes at least one of the following information:
a physical layer related parameter;
a computing resource related parameter;
a service related parameter;
a network related parameter;
an algorithm parameter required by the receiving device during decoding;
an overall evaluation parameter; or
parameter indication information.

Optionally, the physical layer related parameter includes at least one of the following information:
an available physical resource;
a channel type; or
an environmental parameter.

Optionally, the computing resource related parameter includes at least one of the following information:
a network size that a transmitting device and/or the receiving device can process;
a network depth that the transmitting device and/or the receiving device can process; or
a network type that the transmitting device and/or the receiving device can process.

Optionally, the service related parameter includes at least one of the following information:
a quantity of bits in each application cache;
a target quality of service;
a service type; or
a historical experience.

Optionally, the network related parameter includes at least one of the following information:
- a network type;
- a network coefficient;
- an activation function type; or
- indication information identifying at least one of the network type, the network coefficient, or the activation function type.

Optionally, the algorithm parameter required by the receiving device during decoding includes at least one of the following information:
- an algorithm type;
- an algorithm related coefficient; or
- indication information identifying an algorithm related parameter set.

Optionally, the coding and decoding parameter is configured in advance or indicated through at least one of the following target sources:
- a transmitting device;
- a physical layer of the transmitting device;
- a MAC layer of the transmitting device;
- RRC layer of the transmitting device;
- an application layer of the transmitting device;
- the physical layer of the receiving device;
- a MAC layer of the receiving device;
- RRC layer of the receiving device; or
- a control node.

Optionally, the exchanging a coding and decoding parameter includes:
- obtaining indication information of the coding and decoding parameter.

Optionally, the method further includes:
- sending feedback information to a transmitting device, where the feedback information includes at least one of the following information:
- a CRC result;
- whether receiving is performed correctly;
- quality of decoded data; or
- an application corresponding to the data.

Optionally, the quality of the decoded data is generated in a manner specified in advance.

Optionally, the manner specified in advance includes assigning a network for calculating the quality of the decoded data.

Optionally, after the decoding coded information that is received, the method further includes:
- obtaining retransmission data and a retransmission decoding parameter; and
- decoding the retransmission data.

The retransmission decoding parameter includes at least a retransmission indication, so that the receiving device learns whether the currently received data is retransmitted. For retransmission data, corresponding decoding is completed.

Optionally, the retransmission decoding parameter is notified at a higher layer and/or the physical layer.

Moreover, retransmission decoding may use a coding and decoding parameter of last transmission, or a coding and decoding parameter corresponding to retransmission may be exchanged with the transmitting device, that is, the retransmission decoding parameter further includes the coding and decoding parameter.

Optionally, the decoding the retransmission data includes:
- decoding the retransmission data by using a network the same as that of last transmission or a network different from that of last transmission, and merging decoded retransmission data and last decoded transmission data.

Figure 3:
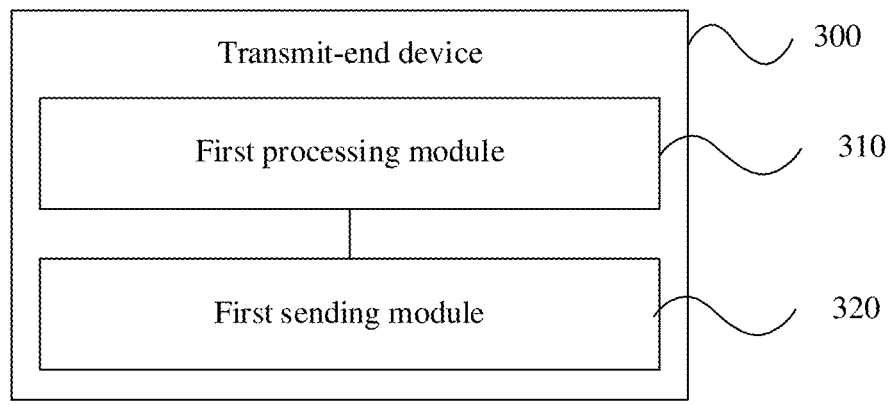
FIG. 3 is a schematic structural diagram of a transmitting device according to an embodiment of the present application.

FIG. 3 is a block diagram of a transmitting device according to an embodiment of the present application. The transmitting device 300 shown in FIG. 3 includes a first processing module 310 and a first sending module 320.

The first processing module 310 is configured to code a transmission bit in an available coding scheme; and
the first sending module 320 is configured to send coded information, where
the available coding scheme includes at least one of:
- performing joint source-channel coding at a physical layer;
- performing channel coding with a code rate greater than one at the physical layer;
- performing joint source-channel coding with a code rate greater than one at the physical layer;
- performing channel coding at the physical layer by directly using an input bit as an output bit;
- performing channel coding at the physical layer, the channel coding including at least the following two parts: a cyclic redundancy check CRC part and a part directly using an input bit as an output bit; or
- using joint channel-source coding at a non-physical layer.

Optionally, the available coding scheme is indicated in a manner of indicating a Modulation and Coding Scheme MCS table, where the MCS table is used for indicating at least one of a code rate or a modulation scheme.

Optionally, the non-physical layer is a layer above a Transmission Control Protocol or User Datagram Protocol layer.

Optionally, the transmitting device further includes:
- a second sending module, configured to send coding and decoding indication information, where the coding and decoding indication information includes information indicating at least one of:
- whether to use channel coding;
- whether to use joint source channel coding;
- whether to use a type of coding with a code rate greater than one;
- whether to use channel coding at the physical layer;
- whether to use channel coding or joint source-channel coding at the non-physical layer;
- whether to perform channel coding at the physical layer by directly using an input bit as an output bit; or
- whether to perform channel coding at the physical layer, the channel coding including at least the following two parts: a CRC part and a part directly using an input bit as an output bit.

Optionally, the transmitting device further includes:
- a first exchanging module, configured to exchange a coding and decoding parameter, where the coding and decoding parameter includes at least one of the following information:
- a physical layer related parameter;
- a computing resource related parameter;
- a service related parameter;
- a network related parameter;
- an algorithm parameter required by the transmitting device during coding;
- an overall evaluation parameter; or
- parameter indication information.

Optionally, the physical layer related parameter includes at least one of the following information:
- an available physical resource;
- a channel type; or
- an environmental parameter.

Optionally, the computing resource related parameter includes at least one of the following information:

a network size that the transmitting device and/or a receiving device can process;
a network depth that the transmitting device and/or the receiving device can process; or
a network type that the transmitting device and/or the receiving device can process.

Optionally, the service related parameter includes at least one of the following information:
a quantity of bits in each application cache;
a target quality of service;
a service type; or
a historical experience.

Optionally, the network related parameter includes at least one of the following information:
a network type;
a network coefficient;
an activation function type; or
indication information identifying at least one of the network type, the network coefficient, or the activation function type.

Optionally, the algorithm parameter required by the transmitting device during coding includes at least one of the following information:
an algorithm type;
an algorithm related coefficient; or
indication information identifying an algorithm related parameter set.

Optionally, the coding and decoding parameter is configured in advance or indicated through at least one of the following target sources:
the physical layer of the transmitting device;
a Media Access Control MAC layer of the transmitting device;
Radio Resource Control RRC layer of the transmitting device;
an application layer of the transmitting device;
a receiving device;
a physical layer of the receiving device;
a MAC layer of the receiving device;
RRC layer of the receiving device; or
a control node.

Optionally, the first exchanging module is further configured to:
obtain indication information of the coding and decoding parameter.

Optionally, the transmitting device further includes:
a determining module, configured to determine whether data retransmission is required.

Optionally, the determining module is further configured to:
determine whether retransmission is required according to feedback information of the receiving device, where the feedback information includes at least one of the following information:
a CRC result;
whether receiving is performed correctly;
quality of decoded data; or
an application corresponding to the data.

Optionally, the quality of the decoded data is generated in a manner specified in advance.

Optionally, the manner specified in advance includes assigning a network for calculating the quality of the decoded data.

Optionally, the transmitting device further includes:
a first retransmission processing module, configured to retransmit, in a case that data retransmission is required, to-be-transmitted data by using coding the same as that of last transmission or coding different from that of last transmission.

The transmitting device 300 can implement the processes implemented by the transmitting device in the method embodiment of FIG. 1. To avoid repetition, details are not described herein again. The transmitting device of this embodiment of the present application codes a transmission bit in an available coding scheme; and then sends coded information, to complete current transmission. The available coding scheme includes at least one of: performing joint source-channel coding at a physical layer; performing channel coding with a code rate greater than one at the physical layer; performing joint source-channel coding with a code rate greater than one at the physical layer; performing channel coding at the physical layer by directly using an input bit as an output bit; performing channel coding at the physical layer, the channel coding including at least the following two parts: a cyclic redundancy check CRC part and a part directly using an input bit as an output bit; or using joint channel-source coding at a non-physical layer. Therefore, the coding the transmission bit in the available coding scheme can effectively reduce the time delay of the transmission processing.

Figure 4:
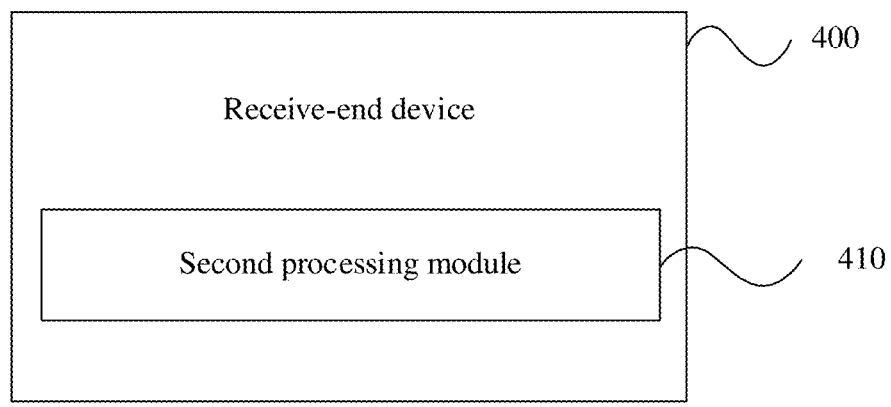
FIG. 4 is a schematic structural diagram of a receiving device according to an embodiment of the present application.

FIG. 4 is a block diagram of a receiving device according to an embodiment of the present application. The receiving device 400 shown in FIG. 4 includes a second processing module 410.

The second processing module 410 is configured to decode coded information that is received, where the coded information is obtained by performing coding in an available coding scheme, where
the available coding scheme includes at least one of:
performing joint source-channel coding at a physical layer;
performing channel coding with a code rate greater than one at the physical layer;
performing joint source-channel coding with a code rate greater than one at the physical layer;
performing channel coding at the physical layer by directly using an input bit as an output bit;
performing channel coding at the physical layer, the channel coding including at least the following two parts: a cyclic redundancy check CRC part and a part directly using an input bit as an output bit; or
using joint channel-source coding at a non-physical layer.

Optionally, the available coding scheme is indicated in a manner of indicating a Modulation and Coding Scheme MCS table, where the MCS table is used for indicating at least one of a code rate or a modulation scheme.

Optionally, the non-physical layer is a layer above a Transmission Control Protocol or User Datagram Protocol layer.

Optionally, the receiving device further includes:
a receiving module, configured to receive coding and decoding indication information, where the coding and decoding indication information includes information indicating at least one of:
whether to use channel coding;
whether to use joint source channel coding;
whether to use a type of coding with a code rate greater than one;
whether to use channel coding at the physical layer;
whether to use channel coding or joint source-channel coding at the non-physical layer;
whether to perform channel coding at the physical layer by directly using an input bit as an output bit; or whether to perform channel coding at the physical layer, the channel coding including at least the following two parts: a CRC part and a part directly using an input bit as an output bit.

Optionally, the receiving device further includes:
a second exchanging module, configured to exchange a coding and decoding parameter, where the coding and decoding parameter includes at least one of the following information:
a physical layer related parameter;
a computing resource related parameter;
a service related parameter;
a network related parameter;
an algorithm parameter required by the receiving device during decoding;
an overall evaluation parameter; or
parameter indication information.

Optionally, the physical layer related parameter includes at least one of the following information:
an available physical resource;
a channel type; or
an environmental parameter.

Optionally, the computing resource related parameter includes at least one of the following information:
a network size that a transmitting device and/or the receiving device can process;
a network depth that the transmitting device and/or the receiving device can process; or
a network type that the transmitting device and/or the receiving device can process.

Optionally, the service related parameter includes at least one of the following information:
a quantity of bits in each application cache;
a target quality of service;
a service type; or
a historical experience.

Optionally, the network related parameter includes at least one of the following information:
a network type;
a network coefficient;
an activation function type; or
indication information identifying at least one of the network type, the network coefficient, and the activation function type.

Optionally, the algorithm parameter required by the receiving device during decoding includes at least one of the following information:
an algorithm type;
an algorithm related coefficient; or
indication information identifying an algorithm related parameter set.

Optionally, the coding and decoding parameter is configured by a user or indicated through at least one of the following target sources:
a transmitting device;
a physical layer of the transmitting device;
a MAC layer of the transmitting device;
RRC layer of the transmitting device;
an application layer of the transmitting device;
the physical layer of the receiving device;
a MAC layer of the receiving device;
RRC layer of the receiving device; or
a control node.

Optionally, the second exchanging module is further configured to:
obtain indication information of the coding and decoding parameter.

Optionally, the receiving device further includes:
a feedback module, configured to send feedback information to a transmitting device, where the feedback information includes at least one of the following information:
a CRC result;
whether receiving is performed correctly;
quality of decoded data; or
an application corresponding to the data.

Optionally, the quality of the decoded data is generated in a manner specified in advance.

Optionally, the manner specified in advance includes assigning a network for calculating the quality of the decoded data.

Optionally, the receiving device further includes:
an obtaining module, configured to obtain retransmission data and a retransmission decoding parameter; and
a second retransmission processing module, configured to decode the retransmission data.

Optionally, the retransmission decoding parameter is notified at a higher layer and/or the physical layer.

Optionally, the second retransmission processing module is further configured to:
decode the retransmission data by using a network the same as that of last transmission or a network different from that of last transmission, and merge decoded retransmission data and last decoded transmission data.

In the receiving device of this embodiment of the present application, coded information that is received is decoded. The coded information is obtained by performing coding in an available coding scheme, and the available coding scheme includes at least one of: performing joint source-channel coding at a physical layer; performing channel coding with a code rate greater than one at the physical layer; performing joint source-channel coding with a code rate greater than one at the physical layer; performing channel coding at the physical layer by directly using an input bit as an output bit; performing channel coding at the physical layer, the channel coding including at least the following two parts: a cyclic redundancy check CRC part and a part directly using an input bit as an output bit; or using joint channel-source coding at a non-physical layer. Therefore, the decoding of the coded information can effectively reduce the time delay of the transmission processing.

Figure 5:
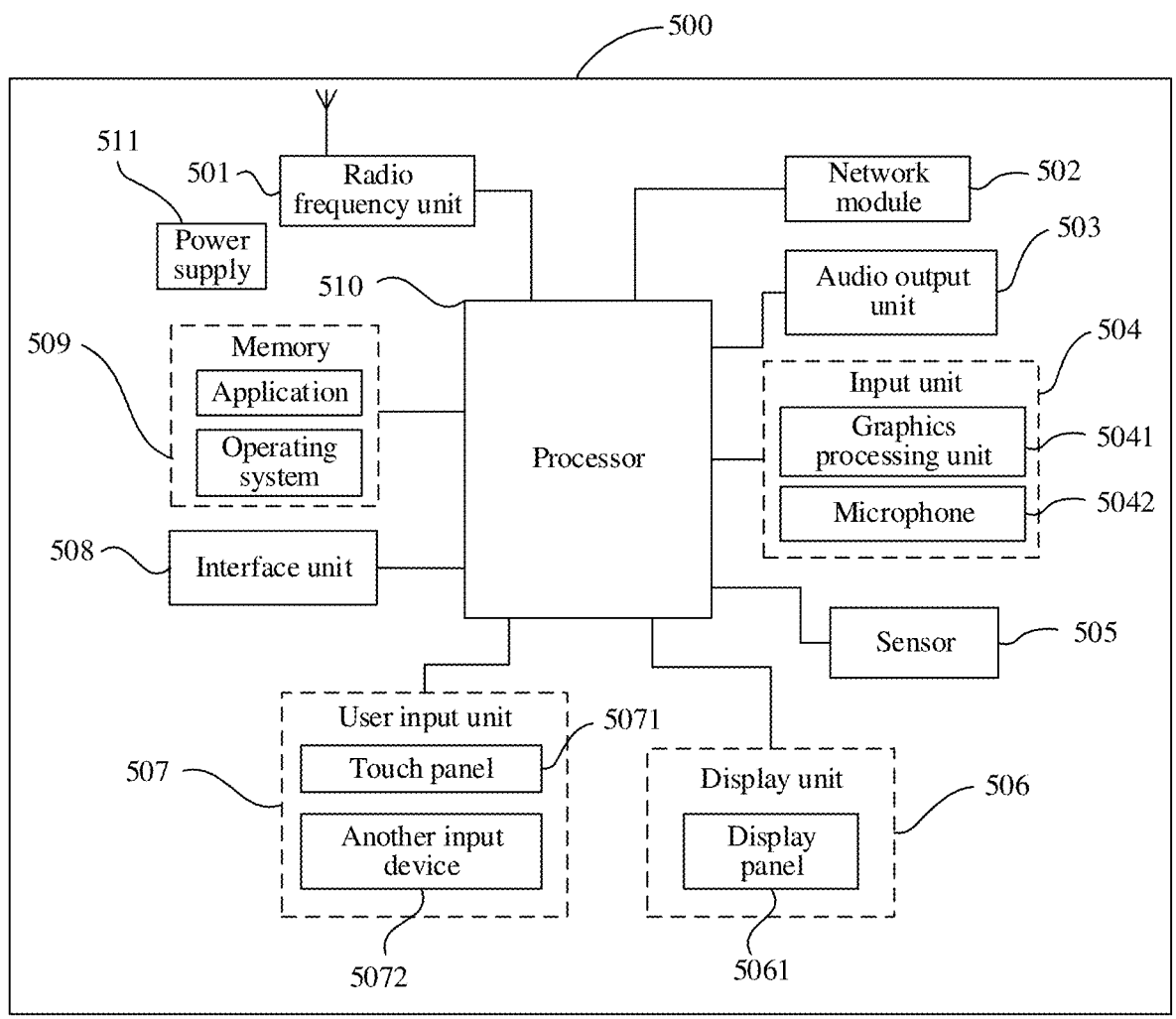
FIG. 5 is a schematic structural diagram of a communication device according to an embodiment of the present application.

FIG. 5 is a schematic structural diagram of hardware of a communication device configured to implement the embodiments of the present application. The communication device 500 includes, but is not limited to, components such as a radio frequency unit 501, a network module 502, an audio output unit 503, an input unit 504, a sensor 505, a display unit 506, a user input unit 507, an interface unit 508, a memory 509, a processor 510, and a power supply 511. A person skilled in the art may understand that the structure of the communication device shown in FIG. 5 does not constitute a limitation to the communication device, and the communication device may include more components or fewer components than those shown in the figure, or some components may be combined, or a different component deployment may be used. In this embodiment of the present application, the communication device includes, but is not limited to, a mobile phone, a tablet computer, a notebook computer, a handheld computer, an in-vehicle terminal, a wearable device, a pedometer, and the like.

The processor 510 is configured to code a transmission bit in an available coding scheme.

The radio frequency unit 501 is configured to send coded information, where the available coding scheme includes at least one of:
performing joint source-channel coding at a physical layer;
performing channel coding with a code rate greater than one at the physical layer;
performing joint source-channel coding with a code rate greater than one at the physical layer;
performing channel coding at the physical layer by directly using an input bit as an output bit;
performing channel coding at the physical layer, the channel coding including at least the following two parts: a cyclic redundancy check CRC part and a part directly using an input bit as an output bit; or
using joint channel-source coding at a non-physical layer.

Alternatively, the processor 510 is configured to decode coded information that is received, where the coded information is obtained by performing coding in an available coding scheme, where the available coding scheme includes at least one of:
performing joint source-channel coding at a physical layer;
performing channel coding with a code rate greater than one at the physical layer;
performing joint source-channel coding with a code rate greater than one at the physical layer;
performing channel coding at the physical layer by directly using an input bit as an output bit;
performing channel coding at the physical layer, the channel coding including at least the following two parts: a cyclic redundancy check CRC part and a part directly using an input bit as an output bit; or
using joint channel-source coding at a non-physical layer.

It can be seen that, the communication device codes a transmission bit in an available coding scheme, or decodes coded information that is received and that is obtained by performing coding in the available coding scheme. The available coding scheme includes at least one of: performing joint source-channel coding at a physical layer; performing channel coding with a code rate greater than one at the physical layer; performing joint source-channel coding with a code rate greater than one at the physical layer; performing channel coding at the physical layer by directly using an input bit as an output bit; performing channel coding at the physical layer, the channel coding including at least the following two parts: a cyclic redundancy check CRC part or a part directly using an input bit as an output bit; or using joint channel-source coding at a non-physical layer. Therefore, the time delay of the transmission processing can be effectively reduced.

It should be understood that in this embodiment of the present application, the radio frequency unit 501 may be configured to receive and transmit information or receive and transmit a signal during a call. For example, after downlink data from a base station is received, the downlink data is sent to the processor 510 for processing. In addition, uplink data is sent to the base station. Generally, the radio frequency unit 501 includes, but is not limited to, an antenna, at least one amplifier, a transceiver, a coupler, a low noise amplifier, a duplexer, and the like. In addition, the radio frequency unit 501 may further communicate with another device through a wireless communication system and network.

The communication device provides wireless broadband Internet access for a user by using the network module 502, for example, helps the user to send and receive an email, browse a web page, and access stream media, and the like.

The audio output unit 503 may convert audio data received by the radio frequency unit 501 or the network module 502 or stored in the memory 509 into an audio signal and output the audio signal as sound. In addition, the audio output unit 503 may further provide an audio output that is related to a particular function executed by the communication device 500 (for example, a call signal receiving sound or a message receiving sound). The audio output unit 503 includes a speaker, a buzzer, a receiver, and the like.

The input unit 504 is configured to receive an audio or video signal. The input unit 504 may include a graphics processing unit (GPU) 5041 and a microphone 5042. The graphics processing unit 5041 performs processing on image data of a static picture or a video that is obtained by an image acquisition device (for example, a camera) in a video acquisition mode or an image acquisition mode. An image frame that has been processed may be displayed on the display unit 506. An image frame processed by the graphics processing unit 5041 may be stored in the memory 509 (or other storage media) or sent by the radio frequency unit 501 or the network module 502. The microphone 5042 can receive sounds and can process such sounds as audio data. The processed audio data can be converted into a format that can be sent to a mobile communication base station through the radio frequency unit 501 in a telephone call mode, for outputting.

The communication device 500 may further include at least one sensor 505, such as an optical sensor, a motion sensor, and other sensors. For example, the optical sensor includes an ambient light sensor and a proximity sensor. The ambient light sensor may adjust luminance of the display panel 5061 according to the luminance of the ambient light, and the proximity sensor may switch off the display panel 5061 and/or backlight when the communication device 500 is moved to the ear. As one type of motion sensor, an acceleration sensor may detect magnitude of accelerations in various directions (which generally are triaxial), may detect magnitude and a direction of the gravity when static, and may be configured to identify a communication device attitude (such as switchover between horizontal and vertical screens, a related game, and attitude calibration of a magnetometer), a related function of vibration identification (such as a pedometer and a knock); and the sensor 505 may further include a fingerprint sensor, a pressure sensor, an iris sensor, a molecular sensor, a gyroscope, a barometer, a hygrometer, a thermometer, an infrared sensor, etc., which are not be repeated herein.

The display unit 506 is configured to display information inputted by the user or information provided for the user. The display unit 506 may include a display panel 5061. The display panel 5061 may be configured by using a liquid crystal display (LCD), an organic light-emitting diode (OLED), or the like.

The user input unit 507 may be configured to receive input digit or character information, and generate key signal input related to the user setting and function control of the communication device. For example, the user input unit 507 includes a touch panel 5071 and another input device 5072. The touch panel 5071, also referred to as a touchscreen, may collect a touch operation of a user on or near the touch panel 5071 (such as an operation of a user on or near the touch panel 5071 by using any suitable object or attachment, such as a finger or a stylus). The touch panel 5071 may include two parts: a touch detection apparatus and a touch controller. The touch detection apparatus detects a touch position of the user, detects a signal generated by the touch operation, and transfers the signal to the touch controller. The touch controller receives touch information from the touch detection apparatus, converts the touch information into touch point coordinates, and transmits the touch point coordinates to the processor 510. In addition, the touch controller receives a command transmitted by the processor 510 and execute the command. In addition, the touch panel 5071 may be implemented by using various types, such as a resistive type, a capacitance type, an infrared type, and a surface acoustic wave type. In addition to the touch panel 5071, the user input unit 507 may further include the another input device 5072. The another input device 5072 may include, but is not limited to, a physical keyboard, a functional key (such as a volume control key or a switch key), a track ball, a mouse, and a joystick, which are not repeated herein.

Further, the touch panel 5071 may cover the display panel 5061. After detecting a touch operation on or near the touch panel 5071, the touch panel transfers the touch operation to the processor 510, to determine a type of a touch event. Then, the processor 510 provides a corresponding visual output on the display panel 5061 according to the type of the touch event. In FIG. 5, the touch panel 5071 and the display panel 5061 implement, as two independent parts, input and output functions of the communication device. However, in some embodiments, the touch panel 5071 and the display panel 5061 may be integrated to implement the input and output functions of the communication device, which is not specifically limited herein.

The interface unit 508 is an interface for connecting an external apparatus to the communication device 500. For example, the external apparatus may include a wired or wireless headset port, an external power supply (or battery charger) port, a wired or wireless data port, a memory card port, a port for connecting an apparatus with a recognition module, an audio input/output (I/O) port, a video I/O port, a headphone port, and the like. The interface unit 508 may be configured to receive an input (such as data information or electric power) from an external apparatus and transmit the received input to one or more elements in the communication device 500 or may be configured to transmit data between the communication device 500 and an external apparatus.

The memory 509 may be configured to store a software program and various data. The memory 509 may mainly include a program storage area and a data storage area. The program storage area may store an operating system, an application required by at least one function (for example, a sound playback function and an image display function), and the like. The data storage area may store data (for example, audio data and an address book) created according to the use of the mobile phone, and the like. In addition, the memory 509 may include a high speed random access memory, and may further include a non-volatile memory, such as at least one magnetic disk storage device, a flash memory or another volatile solid-state storage device.

The processor 510 is the control center of the communication device, and is connected to various parts of the communication device by using various interfaces and lines. By running or executing the software program and/or module stored in the memory 509, and invoking data stored in the memory 509, the processor performs various functions and data processing of the communication device, thereby performing overall monitoring on the communication device. The processor 510 may include one or more processing units. The processor 510 may integrate an application processor and a modem processor. The application processor mainly processes an operating system, a user interface, an application, and the like. The modem processor mainly processes wireless communication. It may be understood that, the modem processor may alternatively not be integrated in the processor 510.

The communication device 500 may further include the power supply 511 (such as a battery) for supplying power to the components. The power supply 511 may be logically connected to the processor 510 by a power management system, thereby implementing functions such as charging, discharging, and power consumption management by using the power management system.

In addition, the communication device 500 includes some functional module that are not shown, which are not described herein in detail.

An embodiment of the present application further provides a communication device, including a processor, a memory, and a computer program stored on the memory and executable on the processor, where the computer program is executed by the processor to implement each process of the foregoing transmission processing method applied to the transmitting device or the foregoing transmission processing method applied to the receiving device, and the same technical effects can be achieved, which will not be described in detail herein again to avoid repetition.

An embodiment of the present application further provides a non-transitory computer-readable storage medium storing a computer program. The computer program is executable by a processor to implement each process of the embodiments of the foregoing transmission processing method applied to the transmitting device or the foregoing transmission processing method applied to the receiving device, and the same technical effects can be achieved, which will not be described in detail herein again to avoid repetition. The non-transitory computer-readable storage medium may include a flash drive, a read-only memory (ROM), a random access memory (RAM), a magnetic disk, or an optical disc.

It should be noted that, the terms "include", "include", or any other variation thereof in this specification is intended to cover a non-exclusive inclusion, which specifies the presence of stated processes, methods, objects, or apparatuses, but do not preclude the presence or addition of one or more other processes, methods, objects, or apparatuses. Without more limitations, elements defined by the sentence "including one" does not exclude that there are still other same elements in the processes, methods, objects, or apparatuses.

Through the descriptions of the foregoing implementations, a person skilled in the art may clearly understand that the method according to the foregoing embodiments may be implemented by means of software and a necessary general hardware platform, and certainly, may alternatively be implemented by hardware, but in many cases, the former manner is a better implementation. Based on such an understanding, the technical solutions of the present application essentially, or the part contributing to the prior art, may be presented in the form of a software product. The computer software product is stored in a storage medium (for example, a ROM/RAM, a magnetic disk, or an optical disc) including several instructions to enable a terminal (which may be a mobile phone, a computer, a server, an air conditioner, a network device, or the like) to perform the methods described in the embodiments of the present application.

The embodiments of the present application have been described above with reference to the accompanying drawings. The present application is not limited to the specific embodiments described above, and the specific embodiments described above are merely exemplary and not limitative. Those of ordinary skill in the art may make various variations under the teaching of the present application without departing from the spirit of the present application and the protection scope of the claims, and such variations shall all fall within the protection scope of the present application.

What is claimed is:

1. A transmission processing method, applied to a transmitting device, and comprising:
   coding a transmission bit in an available coding scheme; and
   sending coded information, wherein
   the available coding scheme comprises at least one of:
   performing channel coding with a code rate greater than one at a physical layer; or
   performing joint source-channel coding with a code rate greater than one at the physical layer.

2. The method according to claim 1, wherein the available coding scheme is indicated in a manner of indicating a modulation and coding scheme (MCS) table, wherein the MCS table is used for indicating at least one of a code rate or a modulation scheme.

3. The method according to claim 1, wherein the available coding scheme comprises further comprises at least one of:
   performing joint source-channel coding at a physical layer; or
   using joint channel-source coding at a non-physical layer wherein
   the non-physical layer is a layer above a transmission control protocol or user datagram protocol layer.

4. The method according to claim 1, wherein the available coding scheme comprises further comprises at least one of:
   performing joint source-channel coding at a physical layer;
   performing channel coding at the physical layer by directly using an input bit as an output bit;
   performing channel coding at the physical layer, the channel coding comprising at least following two parts: a cyclic redundancy check (CRC) part of a part directly using an input bit as an output bit; or
   using joint channel-source coding physical layer;
   wherein the method further comprises:
   sending coding and decoding indication information, wherein the coding and decoding indication information comprises information indicating at least one of:
   whether to use channel coding;
   whether to use joint source channel coding;
   whether to use a type of coding with a code rate greater than one;
   whether to use channel coding at the physical layer;
   whether to use channel coding or joint source-channel coding at the non-physical layer;
   whether to perform channel coding at the physical layer by directly using an input bit as an output bit; or
   whether to perform channel coding at the physical layer, the channel coding comprising at least following two parts: a CRC part and a part directly using an input bit as an output bit.

5. The method according to claim 1, further comprising:
   exchanging a coding and decoding parameter, wherein the coding and decoding parameter comprises at least one of following information:
   a physical layer related parameter;
   a computing resource related parameter;
   a service related parameter;
   a network related parameter;
   an algorithm parameter required by the transmitting device during coding;
   an overall evaluation parameter; or
   parameter indication information.

6. The method according to claim 1, further comprising:
   determining whether data retransmission is required.

7. The method according to claim 6, wherein the determining whether data retransmission is required comprises:
   determining whether retransmission is required according to feedback information of the receiving device, wherein the feedback information comprises at least one of following information:
   a CRC result;
   whether receiving is performed correctly;
   quality of decoded data; or
   an application corresponding to the data.

8. The method according to claim 6, wherein after the determining whether data retransmission is required, the method further comprises:
   retransmitting, in a case that data retransmission is required, to-be-transmitted data by using coding the same as that of last transmission or coding different from that of last transmission.

9. A transmission processing method, applied to a receiving device, and comprising:
   decoding coded information that is received, wherein the coded information is obtained by performing coding in an available coding scheme, wherein
   the available coding scheme comprises at least one of:
   performing channel coding with a code rate greater than one at a physical layer; or
   performing joint source-channel coding with a code rate greater than one at the physical layer.

10. The method according to claim 9, wherein the available coding scheme is indicated in a manner of indicating a modulation and coding scheme (MCS) table, wherein the MCS table is used for indicating at least one of a code rate or a modulation scheme.

11. The method according to claim 9, wherein the available coding scheme comprises further comprises at least one of:
    performing joint source-channel coding at a physical layer; or
    using joint channel-source coding at a non-physical layer, wherein
    the non-physical layer is a layer above a transmission control protocol or user datagram protocol layer.

12. The method according to claim 9, wherein the available coding scheme comprises further comprises at least one of:
    performing joint source-channel coding at a physical layer;
    performing channel coding at the physical layer by directly using an input bit as an output bit:
    performing channel coding at the physical layer, the channel coding comprising at least following two parts: a cyclic redundancy check (CRC) part of a part directly using an input bit as an output bit; or
    using joint channel-source coding at a non-physical layer:
    wherein the method further comprises:
    receiving coding and decoding indication information, wherein the coding and decoding indication information comprises information indicating at least one of:
    whether to use channel coding;
    whether to use joint source channel coding;
    whether to use a type of coding with a code rate greater than one;
    whether to use channel coding at the physical layer;

whether to use channel coding or joint source-channel coding at the non-physical layer;

whether to perform channel coding at the physical layer by directly using an input bit as an output bit; or whether to perform channel coding at the physical layer, the channel coding comprising at least following two parts: a CRC part and a part directly using an input bit as an output bit.

13. The method according to claim 9, further comprising:

exchanging a coding and decoding parameter, wherein the coding and decoding parameter comprises at least one of following information:

a physical layer related parameter;

a computing resource related parameter;

a service related parameter;

a network related parameter;

an algorithm parameter required by the receiving device during decoding;

an overall evaluation parameter; or parameter indication information.

14. The method according to claim 9, further comprising:

sending feedback information to a transmitting device, wherein the feedback information comprises at least one of following information:

a CRC result;

whether receiving is performed correctly;

quality of decoded data; or an application corresponding to the data.

15. The method according to claim 9, wherein after the decoding coded information that is received, the method further comprises:

obtaining retransmission data and a retransmission decoding parameter; and decoding the retransmission data; wherein the retransmission decoding parameter is notified at a higher layer and/or the physical layer.

16. The method according to claim 15, wherein the decoding the retransmission data comprises:

decoding the retransmission data by using a network the same as that of last transmission or a network different from that of last transmission, and merging decoded retransmission data and last decoded transmission data.

17. A communication device, comprising a processor, a memory, and a computer program stored in the memory and executable on the processor, wherein the computer program, when executed by the processor, causes the communication device to perform:

coding a transmission bit in an available coding scheme; and sending coded information, wherein the available coding scheme comprises at least one of:

performing channel coding with a code rate greater than one at the physical layer; or performing joint source-channel coding with a code rate greater than one at the physical layer.

18. The communication device according to claim 17, wherein the available coding scheme is indicated in a manner of indicating a modulation and coding scheme (MCS) table, wherein the MCS table is used for indicating at least one of a code rate or a modulation scheme.

19. The communication device according to claim 17, wherein the available coding scheme comprises further comprises at least one of:

performing joint channel-coding at a physical layer, or using joint channel-source coding at a non-physical layer, wherein the non-physical layer is a layer above a transmission control protocol or user datagram protocol layer.

20. The communication device according to claim 17, wherein the available coding scheme comprises further comprises at least one of:

performing joint source-channel coding at a physical layer;

performing channel coding at the physical layer by directly using input bit as an output bit;

performing channel coding at the physical layer, the channel coding comprising at least following two parts: a cyclic redundancy check (CRC) part of a part directly using an input bit as an output bit; or using joint channel-source coding a non-physical layer, wherein the computer program, when executed by the processor, causes the communication device to further perform:

sending coding and decoding indication information, wherein the coding and decoding indication information comprises information indicating at least one of:

whether to use channel coding;

whether to use joint source channel coding;

whether to use a type of coding with a code rate greater than one;

whether to use channel coding at the physical layer;

whether to use channel coding or joint source-channel coding at the non-physical layer;

whether to perform channel coding at the physical layer by directly using an input bit as an output bit; or whether to perform channel coding at the physical layer, the channel coding comprising at least following two parts: a CRC part and a part directly using an input bit as an output bit.

* * * * *